Feb. 27, 1940.    P. W. STEPHENS    2,191,975
PRESSURE COOKER
Filed July 6, 1936    3 Sheets-Sheet 2

Inventor:
Percy W. Stephens

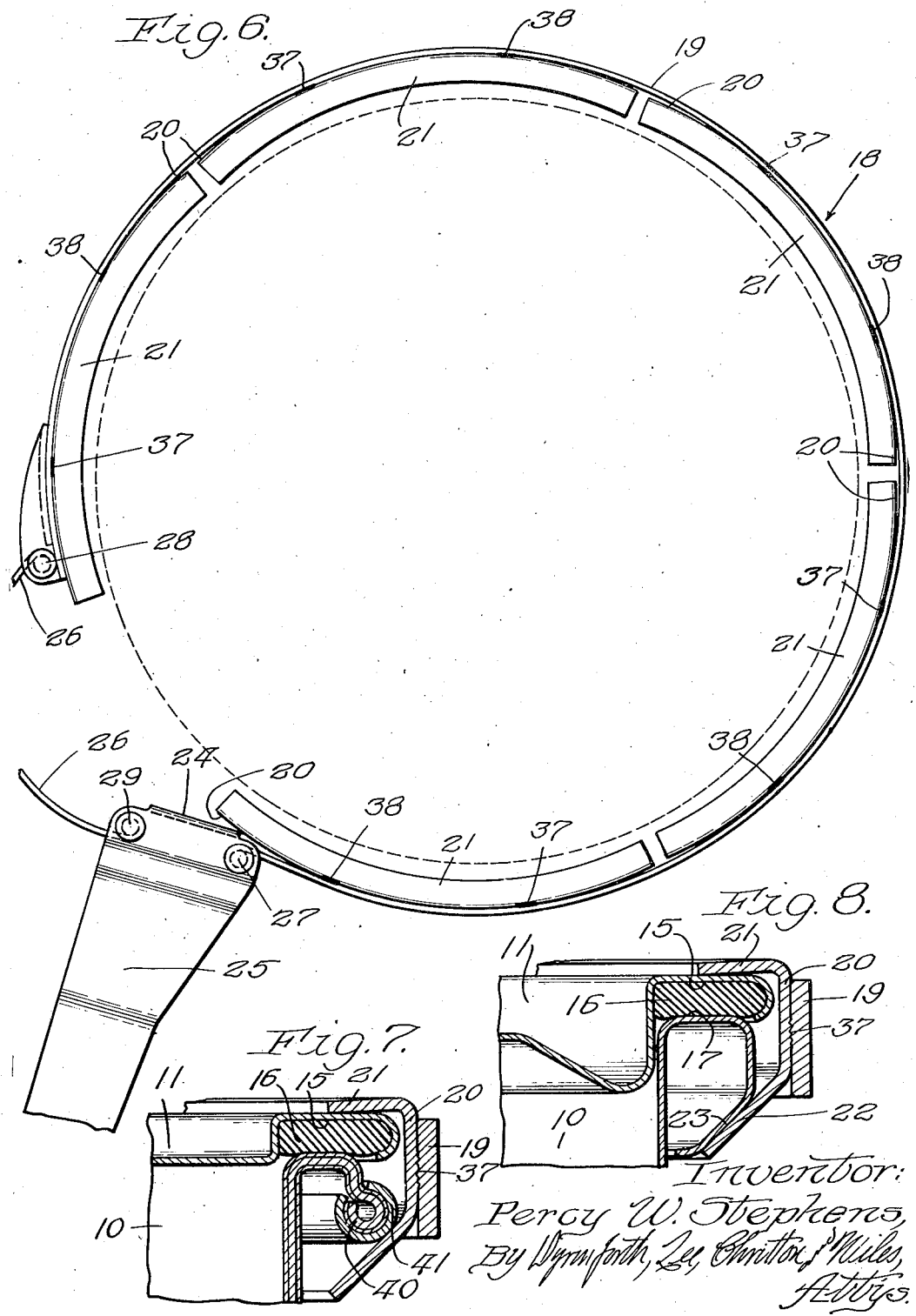

Patented Feb. 27, 1940

2,191,975

UNITED STATES PATENT OFFICE 2,191,975

PRESSURE COOKER

Percy W. Stephens, Chicago, Ill.

Application July 6, 1936, Serial No. 89,189

12 Claims. (Cl. 220—61)

This invention relates to pressure cookers, and more particularly to improved closure means therefor.

One feature of this invention is that it provides a one-piece positively operated closure band for sealing the cover to the body portion of the cooker; another feature of this invention is that the closure means and safety valve means are so constructed and arranged that the cover cannot be removed from the cooker without first venting the pressure therein; a further feature of this invention is that the relief valve is so constructed that venting of over pressure in the cooker does not throw the valve out of its operative range; other features and advantages of this invention will be apparent from the following specification and the drawings, in which—

Figure 1:
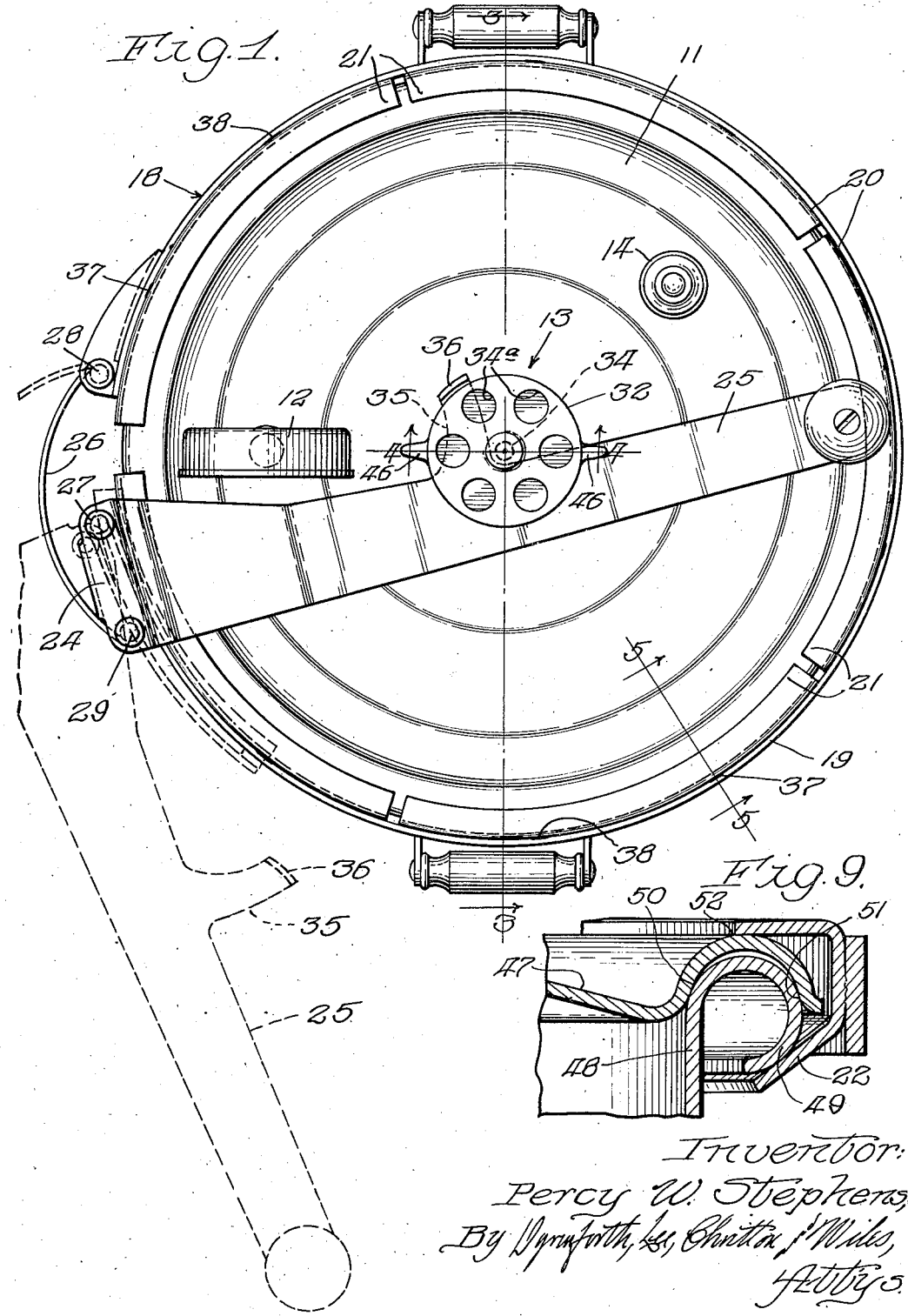
Figure 2:
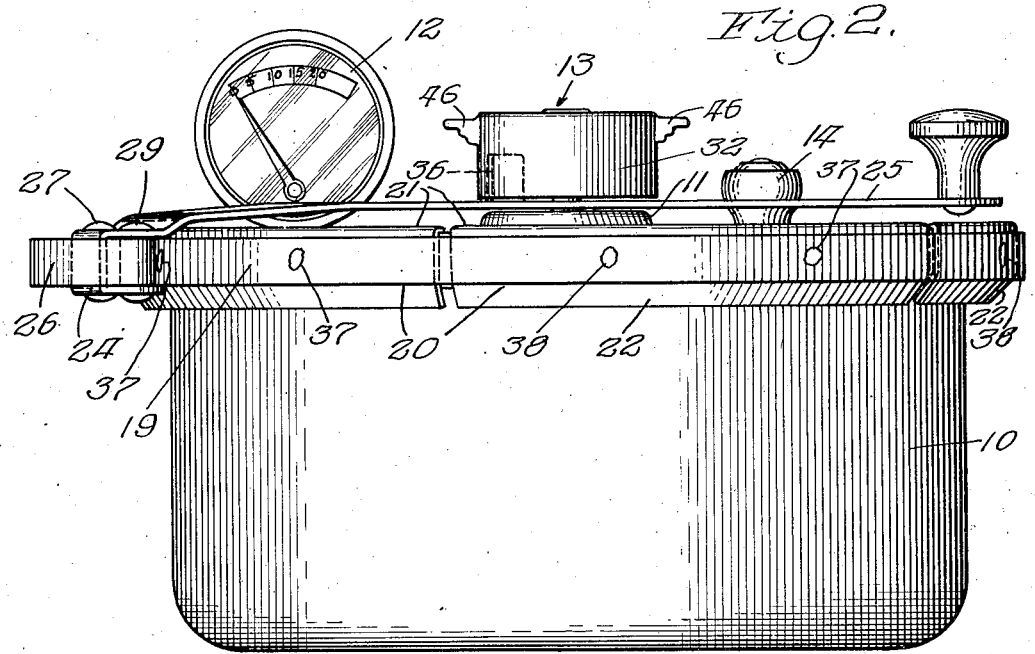
Figure 3:
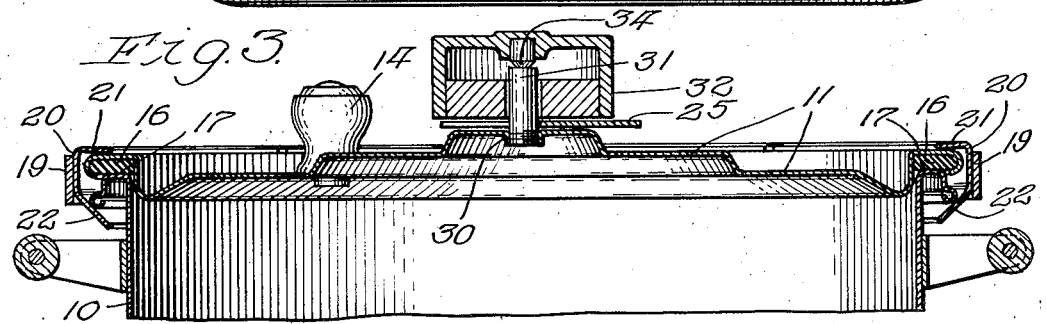
Figures 4, 5:
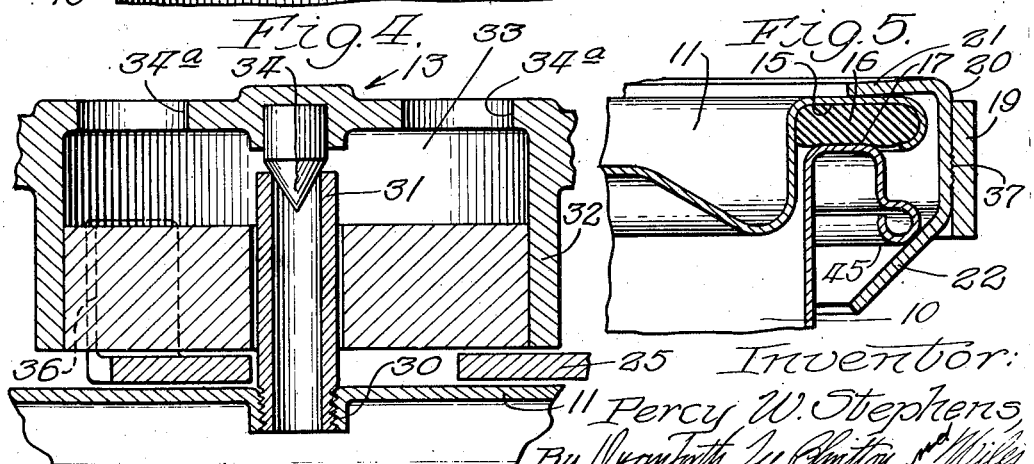

Fig. 1 is a plan view of the cooker with the closure band in position therein; Fig. 2 is a side elevation of the cooker shown in Fig. 1; Fig. 3 is a fragmentary sectional view along the line 3—3 of Fig. 1; Fig. 4 is a detailed sectional view of the valve arrangement along the line 4—4 of Fig. 1; Fig. 5 is a detailed sectional view along the line 5—5 of Fig. 1; Fig. 6 is a plan view of the closure band in expanded position; Fig. 7 is a detailed sectional view of a modified form, similar to Fig. 5; Fig. 8 is a similar view of another modification; and Fig. 9 is a similar view of still another modification wherein no sealing gasket is employed.

In order to make an operative pressure cooker some means must be provided for clamping the cover to the body portion of the cooker to effect a seal therebetween sufficient to maintain the desired pressure in the cooker. This invention provides a closure or clamping means with positive operating means for clamping or disengaging it, the whole so arranged that a single movement effects a tight seal all the way around the periphery of the cover. A relief valve is provided in the cover to protect against excessive pressures within the cooker, and interlocking means is arranged between the positive operating means for the closure and the valve, so that the closure can only be removed to break the seal around the edge of the cover after the interior of the cooker has been vented to atmosphere through the valve.

In the particular embodiment of this invention illustrated herewith a pressure cooker is shown having a body portion 10 and a cover 11. The cover 11 has thereon a pressure gauge 12 of standard type, a relief valve 13, and a handle or knob 14 of heat-insulating material. The cover 11 is provided with a channelled peripheral portion 15 having therein an annular gasket 16 adapted to contact the lip or upper edge 17 of the body portion 10 of the cooker.

Closure means 18 is provided for clamping the cover into sealing engagement with the edge 17, this closure means comprising a flexible metal band 19 having fastened thereto closure segments 20 having a top flange 21 and a bottom flange 22. It will be noted that the top flange 21 diverges downward from the plane of the band at a slght angle, here shown as about five degrees; the bottom flange 22 diverges substantially from the plane of the band, being here shown at an angle of about forty-five degrees with such plane. It will be noted, referring more particularly to Fig. 5, that the edge of the body portion is rolled back on itself, as by a curling die, to provide a substantially rigid annular or peripheral roll 45 adapted to be engaged by the angularly disposed surface of the bottom flange 22.

The ends of the flexible band 19 are adapted to be drawn together or separated by the action of toggle means comprising the base 24 of the operating lever 25 and the spring connecting link 26. One end of the base 24 of the operating lever is connected to one end of the flexible band 19, as by the pivot 27; one end of the spring link 26 is movably connected to the other end of the band 19, as by the pivot 28; and the base 24 of the lever and the link 26 are pivotally connected together at the point 29. Movement of the lever 25 thus actuates the toggle means to positively vary the effective diameter of the closure band, either drawing it together to clamp the cover on the body portion of the cooker, or expanding the band to enable it to be conveniently removed from closure relationship with the cooker.

Referring again to Fig. 5, it will be seen that contraction of the band by the toggle means results, through the interaction of the surface 45 and the diverging flange 22, to seat the cover firmly on the surface 17. The top flange 21 is set at a slight downward angle to the plane of the band, as described before, and drawing the band tight tends to further tilt this top flange downward. Thus the sealing pressure on the cover is effected at a point substantially centrally of the gasket 16, rather than near the outer edge thereof.

The cover 11 has an opening 30 therethrough in which a tube 31 is mounted. Valve means is provided for closing the upper end of this tube 31, here shown as a valve body 32 having a relatively large chamber 33 in the upper part thereof, with openings 34ª through the top thereof giving communication between the chamber 33 and atmosphere. A cone-shaped valve member 34 projects downwardly into the chamber 33 from the top of the valve body 32, and is adapted to close the opening at the top of the tube 31. The valve body 32 is also provided with a handle 46 of heat insulating material, enabling it to be conveniently removed when the cooker is hot. The internal diameter of the tube 31 and the weight of the valve body 32 are so proportioned that pressures up to the desired maximum will not lift the valve member 34 from its sealing position in the top of the tube 31; as soon as the pressure within the cooker exceeds the desired maximum, however, the upward force exerted on the valve member 34 is sufficient to lift it from its seat in the top of the tube 31, thus venting the vapor pressure within the cooker into the chamber 33. Since this chamber is relatively large with respect to the size of the passage through the tube 31 and it has a plurality of relatively large openings 31 in the top thereof communicating to atmosphere, the vapors coming up through the tube are able to expand in the chamber 33 and pass to atmosphere without their expansion reaction throwing the valve body up high enough to disturb the operative relationship between the valve member 34 and the tube 31. Thus, after the pressure has vented itself to a safe point the valve 34 again drops into position, closing the tube 31.

In the particular embodiment of this invention disclosed herewith, the internal diameter of the tube is $\frac{3}{32}$ inch, and the valve weight eight ounces, the relief valve venting at a pressure of fifteen pounds per square inch. If it is desired to have the pressure relieved at a lower point, a proportionately larger tube or smaller weight should be used.

The lever 25 which operates the toggle means is provided with an extension portion 35 having an upturned end or means 36 adapted to engage the valve body 32 when the lever 25 is in closed or clamping position. When the toggle is being either opened or closed the valve member 32 is removed by means of a handle 46. To close the cooker the cover is placed in position, the closure band placed around it in the proper plane, and the lever 25 moved into the position shown in Fig. 1 to draw the ends of the metal band 19 together through the tension of the spring member 26 and thus clamp the cover onto the body portion of the cooker through the wedging action of the diverging flange 22 on each of the closure segments 20. When the lever is in closed position the valve body 32 is placed over the tube 31, and the lever 25 is thus locked in that position; that is, it is prevented from outward movement by engagement of the valve member or body 32 with the upward projection 36. Before the closure means can be loosened to remove the cover, therefore, the valve body 32 must be removed to vent any pressure remaining within the cooker to atmosphere. This is an important safety feature, since it prevents a housewife from opening the closure means and breaking the seal between the cover and body portion of the cooker while there is any pressure remaining within the cooker.

Each closure segment 20 is fastened to the flexible band 19 throughout a portion of its length, here shown as being spot welded thereto at the two points 37 and 38. This two-spaced-point fastening is effective to maintain the band against the closure segment throughout the distance between the two points, just as though it were integrally fastened thereto for that length. Referring more particularly to Fig. 1, it will be seen that when in closed position the closure segments are mounted rather closely adjacent each other, that is, there is very small spacing between them. This small spacing enables a cover of relatively thin metal to be used, since it is furnished with support throughout practically its entire circumference. On the other hand, since the segments are not fastened to the flexible band at their ends but somewhat removed therefrom, a fairly large portion of the flexible band is available for expansion and contraction when the toggle means is used to vary the effective diameter of the band. This will be readily seen from the consideration of Fig. 6, where the closure band is shown in expanded position. The length throughout which the segments are fastened to the band is important, since if they are fastened only in the center they do not move outwardly sufficiently far for the flanges to clear the edge of the cover when the band is expanded; on the other hand, if they are fastened to the band clear to the ends thereof, the only part of the band available for flexing is the very short distance between them, which makes a very stiff and undesirable closure ring. It has been found that the segment should be effectively attached to the band throughout a space from about one-fifth to three-fifths of the segment length, and preferably the spot welds 37 and 38 have a spacing between them about one-third of the segment length.

A modified construction is shown in Fig. 7, wherein the body portion of the cooker may be of enameled sheet iron. In this construction the edge of the body portion is also formed in a small roll 40 at a point removed from the actual body. An enclosing tube or second roll 41 of some corrosion resisting metal, as aluminum, is then rolled into place about the portion 40. This tube 41 provides a bearing surface for the lower flange 22, so that constant action of this flange thereagainst does not damage the corrosion resistance, as would be the case were the flange used directly against the enameled surface of the body.

The modification shown in Fig. 8 is adapted for use where the body portion of the cooker is of metal of sufficient strength to withstand the pressure of the closure band at the surface 23 without the necessity of a reinforcing roll. This surface 23 gives a broader contact with the inner surface of the flange 22, and may be very conveniently formed by a die.

Fig. 9 illustrates a modified construction wherein the gasket 16 is eliminated and a metal-to-metal seal is formed between the cover 47 and the body portion 48. The body portion is curled outward and downward, as at 49, and is adapted to be contacted near the bottom of the curl by the flange 22 in the usual manner to force the cover 47 into engagement with the body portion of the cooker. The outer edge of the cover, here made of resilient metal, is given an outward and downward peripheral curl of such kind that the radius of the inner surface is less than the radius of the outer surface of the curl 49 of the body portion. Thus the cover contacts the body portion at the points 50 and 51 only, and pressure at the point 52 serves, because of the resilience of the metal of the cover, to make a wiping metal-to-metal seal at the points 50 and 51.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

I claim:

1. A closure device for sealing the cover to the body portion of a pressure cooker, including: a substantially circular flexible metal band; closure segments fastened to said band and having flanges extending inwardly therefrom, the top flange of each of said segments diverging slightly downward from the plane of said band and the bottom flange diverging substantially downward therefrom; and means for positively varying the effective diameter of said band.

2. Apparatus of the character claimed in claim 1 wherein said band has at least three segments fastened thereto.

3. A closure device for sealing the cover to the body portion of a pressure cooker, including: a substantially circular flexible metal band; at least three closure segments fastened to said band closely adjacent each other and having flanges extending inwardly therefrom, at least one of said flanges on each of said segments diverging from the plane of said band, each of said segments being fastened to said band at at least two points spaced from the ends of said segments and from each other; and means for positively varying the effective diameter of said band.

4. Apparatus of the character claimed in claim 3, wherein said points are spaced apart from one-fifth to three-fifths of the length of the segment.

5. Apparatus of the character claimed in claim 3, wherein said points are spaced apart substantially one-third of the length of the segment and symmetrically located with respect to the ends of the segment.

6. A closure device for sealing a cover having a valve projecting thereabove to the body portion of a pressure cooker, including: means for clamping said cover against said body portion; lever means for operating said clamping means; and means on said lever adapted to be lockably engaged by said valve, whereby said clamping means cannot be released until said valve has been opened.

7. A pressure cooker of the character described, including: a body portion; a cover; valve means in said cover; means for clamping said cover against said body portion to effect a seal therebetween; lever means for operating said clamping means; and means on said lever adapted to interlock with said valve when said lever is in clamped position and said valve is in closed position, whereby said valve must be opened to disengage said last-mentioned means.

8. A pressure cooker of the character described, including: a body portion; a cover; valve means in said cover projecting thereabove; a closure band; toggle means for varying the effective diameter of said band to clamp said cover against said body portion to effect a seal therebetween; lever means for operating said toggle means; and means on said lever adapted to be lockingly engaged by said valve means when said lever is in clamped position and said valve is closed, whereby said valve must be opened to disengage said lever.

9. A pressure cooker of the character described, including: a body portion; a cover having an opening therethrough; valve means adapted to close said opening; a closure band substantially circular in shape; closure segments on said band having inwardly projecting flanges, at least one of the flanges in each of said segments diverging substantially from the plane of the band; toggle means for varying the effective diameter of said band to clamp said cover against said body portion to effect a seal therebetween; lever means for operating said toggle means; and projecting means on said lever adapted to be lockingly engaged by a flange on said valve means to retain said lever in clamped position when said valve is closed, whereby said valve must be opened to release said closure means.

10. A container of the character described, including: a body portion having an outwardly and downwardly turned peripheral curl at the top thereof; a peripheral roll at the edge of said curl; a cover adapted to form a closure for said container; and a closure band having inwardly extending flanges, at least one of said flanges diverging from the plane of said band, one of said flanges being adapted to contact said cover and the other said roll, whereby contraction of said band seals said cover to said body portion.

11. Apparatus of the character claimed in claim 10, wherein a second roll of metal is interposed between the roll and the flange.

12. A retaining device comprising expansible and contractible retaining means having portions movable toward and away from each other upon operation of the device, and operating means for moving such portions toward or away from each other to contract or expand the retaining means, said operating means comprising link means connected with one of said portions and a member connected at one part thereof with said link means and at another part thereof with the other of said portions and having a handle connected therewith intermediate said parts thereof.

PERCY W. STEPHENS.